Sept. 22, 1953          R. G. PIETY                    2,653,306
                         SEISMOMETER Filed Oct. 3, 1949                              3 Sheets-Sheet 1

INVENTOR.
R. G. PIETY
BY Hudson & Young
ATTORNEYS

Sept. 22, 1953 R. G. PIETY 2,653,306
SEISMOMETER
Filed Oct. 3, 1949 3 Sheets-Sheet 2
FIG. 2
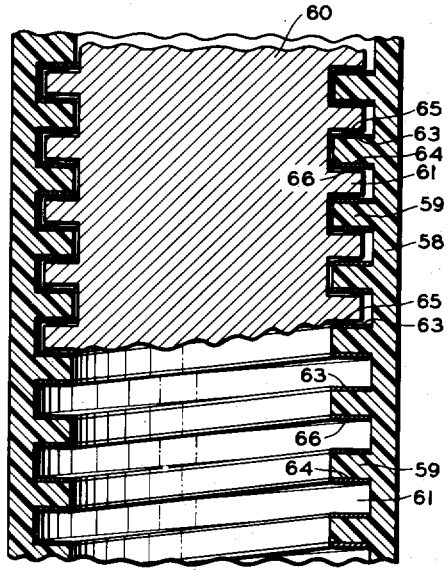
FIG. 3.
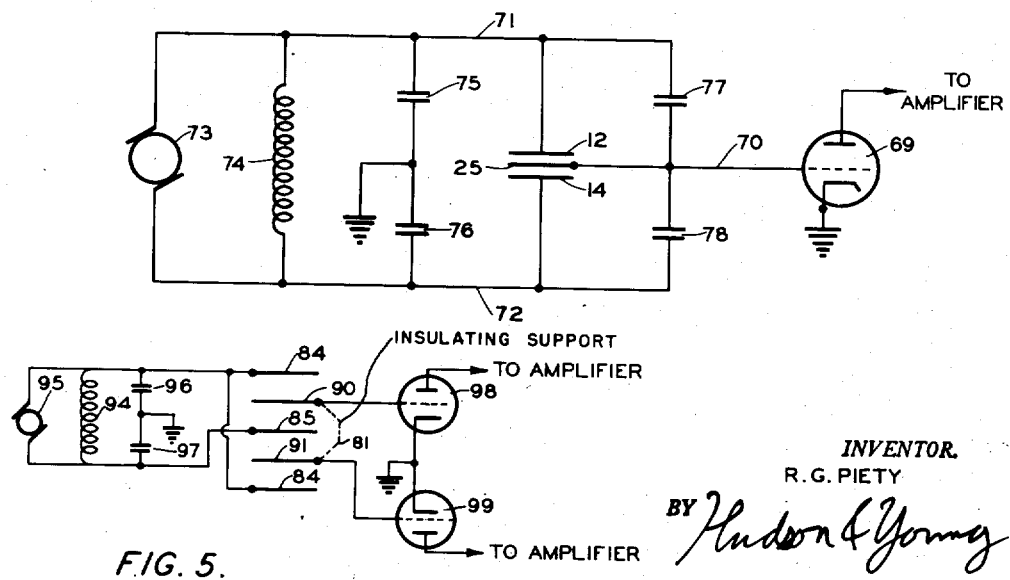
FIG. 5.
INVENTOR.
R.G. PIETY
BY Hudson & Young
ATTORNEYS Sept. 22, 1953  R. G. PIETY  2,653,306
SEISMOMETER Filed Oct. 3, 1949 3 Sheets-Sheet 3

INVENTOR.
R. G. PIETY
BY Hudson & Young
ATTORNEYS

Patented Sept. 22, 1953

2,653,306

UNITED STATES PATENT OFFICE 2,653,306

SEISMOMETER

Raymond G. Piety, Bartlesville, Okla., assignor to Phillips Petroleum Company, a corporation of Delaware Application October 3, 1949, Serial No. 119,367

12 Claims. (Cl. 340—17)

This invention relates to seismometers and to a method for making seismometers. In another aspect, it relates to seismometers in which seismic waves are transformed into capacitance variations representative thereof.

Heretofore, seismometers have ordinarily utilized motion of a coil in a magnetic field to produce voltage variations representative of the seismic waves. Such seismometers are ordinarily rather bulky due to the necessity of providing a magnetic circuit to establish a field for the moving coil. It has been proposed to substitute a capacitive type seismometer for the moving coil type. In such a case, seismic waves would produce relative movement between two metal strips or plates arranged as a condenser, and this relative movement would change the capacity between the condenser plates. However, difficulties have arisen in the practical application of this principle to the actual construction of seismometers, in that a large surface area is required to produce measurable capacitance changes in response to the small movements produced between the plates by seismic waves. Further, a very close and uniform spacing must be maintained between the plates or the capacitance thereof will not vary linearly with the amplitude or the seismic waves.

In accordance with the present invention, difficulties heretofore encountered in the construction of capacitance type seismometers are overcome by utilizing screw threads as the elements between which the capacitance to be measured is developed. Screw threads may be accurately machined and held to close tolerances so that it is possible to obtain a large surface area between the conductors defining the condenser while maintaining the requisite close spacing. The two elements defining the condenser are mounted by a novel spring suspension so that seismic waves incident upon the seismometer produce relatively large capacitance variations representative of the seismic waves.

It is an object of the invention to provide an improved seismometer of the capacitance type.

It is a further object of the invention to provide an improved method for making a seismometer of the capacitance type.

It is a still further object to provide a seismometer of extremely small size and rugged construction having an output comparable with that of much large seismometers of the moving coil type.

Various other objects, advantages and features of the invention will become apparent from the following detailed description, taken in conjunction with the accompanying drawings, in which:

Figure 2 is a vertical sectional view of a modified form of seismometer;

Figure 3 is a schematic circuit diagram illustrating the electrical connection of the seismometer to an amplifier unit;

Figure 5 is a schematic circuit diagram illustrating the electrical connection of the seismometer of Figure 4 to an amplifier unit.

Figure 1:
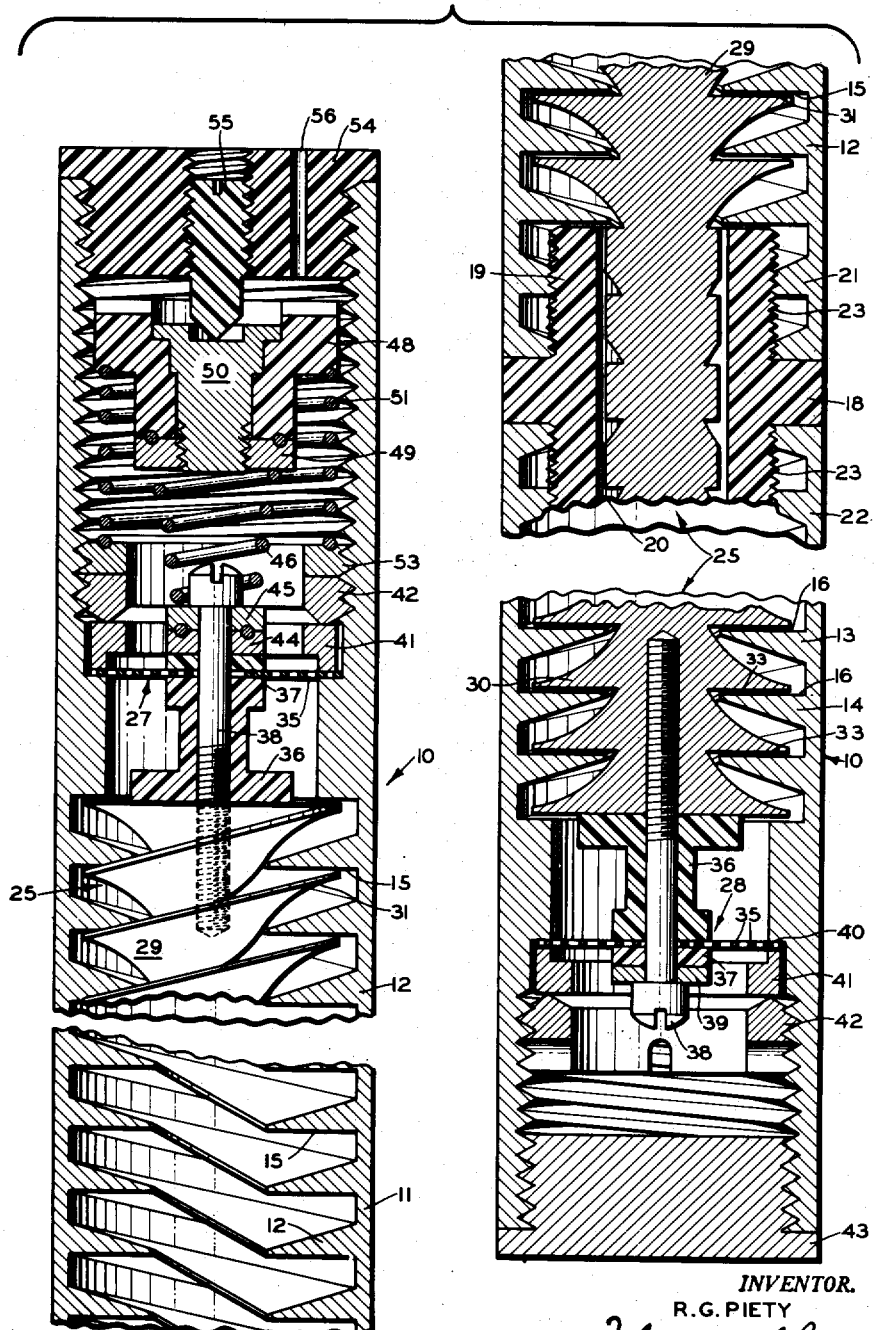
Figure 1 is a vertical sectional view of the seismometer of this invention.

Referring now to the drawings in detail, and particularly to Figure 1, the seismometer comprises a cylindrical casing 10 having a central passage formed therein. The upper part 11 of the casing is machined to form helical threads 12 and the lower part 13 of the casing is machined to form helical threads 14 of opposite pitch. In the present embodiment of the invention, the casing is formed from conductive metal so that the threads 12 define a continuous helical metal surface 15 and the threads 14 define a continuous helical metal surface 16. The upper section 11 and the lower section 13 of the casing are separated and electrically insulated from each other by a flanged portion 18 of a split insulating sleeve 19, this sleeve defining an inner cylindrical passage 20. It will be noted that the threads 12, 14 adjacent sleeve 19 have their inner surfaces machined away and that the cut away threads, such as threads 21 and 22, have their inner surfaces tapped to engage threads 23 formed on the outer surface of insulating member 19. In this fashion, the insulating member 19 supports the adjacent sections of the casing and insulates them from each other.

In accordance with the invention, a metal armature 25 is freely suspended for longitudinal movement within the passage in casing 10 by spring suspension units 27 and 28. The armature includes an upper threaded section 29, complementary with threaded portion 12 and a lower threaded section 30 of opposite pitch which is complementary with the threaded portion 14. The threads at the central region of the armature are cut away to form a tubular section disposed within the sleeve 19. The armature threads are of slightly less width than the threads 12, 14 so that the upper threads 29 define a ontinuous flat helical metal surface 31 which is closely spaced to the conductive surface 15 defined by the threads 12, and the threads 30 define a continuous helical surface 33 of conductive metal which is closely spaced to the continuous conductive surface 16 defined by the threads 14 in the casing.

Assuming that the casing is moved downwardly relative to the armature in response to seismic incident upon the seismometer, the spacing between surfaces 15, 31 is decreased and the spacing between surfaces 16, 33 is increased. As a result, the capacitance between the upper section of the armature and the casing is increased while the capacitance between the lower section of the armature and the casing is decreased, the changes in capacitance being proportional to the amplitude of the seismic waves incident upon the seismometer. When the casing moves upwardly relative to the armature, an opposite action occurs with the result that the capacitance between the armature and the lower section of the casing is increased while the capacitance between the armature and the upper section of the casing is decreased. It will be understood that the armature remains in a substantially stationary position due to its inertia when the casing is removed relative to the armature by seismic waves incident upon the seismometer.

The spring suspensions 27, 28 provide a free suspension of the armature relative to the casing, thereby allowing the described movement between these parts responsive to seismic waves to take place. Spring suspension 28 includes a flat spiral spring 35 having its inner end secured between an insulating stud 36 and a washer 37, these parts being secured to the lower end of armature 25 by a screw 38 and a metal washer 39. The outer end of spiral spring 35 is mounted between a flange 40 formed on the casing and a spacer 41 which is forced into engagement with the spring by a lock nut 42 threaded within the casing. A cap 43 is provided at the lower end of the casing to seal the seismometer unit. Spring suspension 27 is of similar construction and includes a flat spiral spring 35, a stud 36, an insulating washer 37, a screw 38, a spacer 41, and a lock nut 42 whose structure and function are similar to those of the corresponding parts of spring suspension 28. Metal washer 39, however, is replaced by a pair of spring retainer plates 44, 45 which support one end of a helical spring 46. The other end of spring 46 is secured to a piston assembly 48 by a spring retainer plate 49 threaded on a metal stud 50. The piston assembly is freely suspended for longitudinal movement within the casing 10 and it is urged in an upward direction by a helical spring 51 which is mounted between piston assembly 48 and a nut 53. The upper end of the casing is closed by a cap 54 which carries a set screw 55 bearing on stud 50 and has an opening 56 therein to carry the electrical conductors, not shown, attached to the movable parts of the seismometer.

In the operation of the spring suspension unit, spring 51 urges piston assembly 48 into engagement with set screw 55. The spring 46, which is maintained in tension, exerts an upward force upon the armature 25 which is proportional to the distance between piston 48 and the armature. Accordingly, by moving set screw 55, the vertical position of piston 48 may be varied with resultant variation in the upward tension placed upon the armature by spring 46. This structure thus provides a simple and efficient method of accurately regulating the original vertical position of the armature with respect to the casing. That is, adjustment of set screw 55 changes the initial spacing between conductive surfaces 15, 31 and between conductive surfaces 16 and 33. The flat spiral springs 35 tend to maintain the armature in a predetermined position such that the distance between surfaces 15, 31 is equal to the distance between surfaces 16 and 33. Accordingly, springs 35 provide the primary force for holding the armature in desired position relative to the casing while the piston 48 and its associated springs provides a means for making minor adjustments of the position of the armature in the casing.

A modified form of seismometer is shown in Figure 2 which shows only the central portion of the armature and casing. It will be understood that both ends of the structure are extended and provided with spring suspension units in the manner illustrated by Figure 1. In this modification, a casing 58 is provided with interior threads 59 of square or rectangular cross section, the casing and threads being formed from a suitable insulating material, such as Bakelite. An armature 60 is suspended within the casing 58 and this armature is provided with threads 61 of rectangular cross section which are complementary with the threads 59 formed in the casing. The armature is formed from conductive metal and the threads therein are of lesser width than the space between the threads 59 formed in the casing. Accordingly, the spring suspension units, not shown, allow relative movement between the armature and casing in the manner described in connection with Figure 1.

In forming the stator, the threads 59 have a metal plating applied thereto of a conductive material, such as copper. During the plating operation, the conductive metal is applied to the entire surface of the threads. After the plating operation is completed, the inner or peripheral edges of the threads 59 are machined, thereby to remove the plating together with a small portion of the thread material itself. As a result, the plate material remaining at the sides of the thread defines two continuous helical plates 63 and 64, one at each side of the threaded portion 29. These plated strips cooperate with the facing surfaces of the armature threads to form condenser elements, the capacitance of which is changed responsive to relative movement between the armature and casing. Assuming that the armature is originally positioned so that the threads 61 lie midway between the threads 59, upward movement of the casing relative to the armature causes the surfaces 65 of the armature to move closer to plated strip 63 and surfaces 66 of the armature to move away from plated surfaces 64. As a result, the capacitance between the armature and plated strip 63 is increased while the capacitance between the armature and plated surface 64 is decreased. Downward movement of the casing relative to the armature produces an opposite result, that is, the capacitance between the armature and plated strip 64 is increased while the capacitance between the armature and plated strip 63 is decreased. These changes in capacitance are proportional to the degree of relative movement between the casing and armature, and hence the amplitude of the seismic waves incident upon the seismometer.

It will be apparent that I have provided a seismometer of the variable capacitance type in which relatively movable surfaces are closely spaced throughout a large area to provide a high capacitance and a high change in capacitance in response to relative movement between the condenser plates. The accuracy of spacing results from the use of threaded elements as the cooperating condenser plates, these threaded elements being readily machined by known apparatus to a high degree of accuracy. The dimensions of the seismometer are substantially smaller than those of conventional seismometers of the moving coil type. In fact, the dimensions of the present seismometer may be approximately six inches in length and three-fourths of an inch in diameter. This permits the use of a number of seismometers at the same level in a bore hole while allowing ample room for connections to the seismometers and for placing other apparatus in the bore hole. When used at the surface, the seismometer may be enclosed in a plastic case and forced into the ground by the force of a person's heel, thus obviating the necessity for using costly and cumbersome planting devices.

The advantage of this type of seismometer over the conventional magnetic type is that a high frequency power supply may be used, which permits use of amplifiers having small component parts. The seismometer of this invention is particularly adapted for use in a radio seismic system, and it simplifies the feedback problems of automatic volume control in that the amplitude of the power supply can be controlled. This capacitor type of seismometer lends itself to multi-unit operation over a single pair of leads, since each of a plurality of seismometers can be supplied with a different frequency with separation of the frequencies being made at the receiving station.

A preferred method of connecting the seismometer of this invention in an amplifier circuit is shown by Figure 3. This circuit includes an electron tube 69 having an anode, a cathode, and a control grid. The anode and cathode are connected to a subsequent amplifier stage in the usual manner while the control grid is connected by a lead 70 to the armature 25 of the capacitive seismometer. The two remaining stator elements of the seismometer are connected to leads 71 and 72, these wires also being connected to a current source 73, and an inductance 74. The inductance is shunted by a pair of series-connected condensers 75 and 76, the junction between which is grounded. A condenser 77 is connected between leads 70, 71 and a condenser 78 is connected between leads 70 and 72. When the armature is positioned midway between the stator plates, the circuit is balanced and a zero average potential is applied to the control grid of an electron tube 69. When the armature moves toward either of the stator plates responsive to seismic waves incident upon the seismometer, a voltage is impressed upon the control grid of tube 69 which is directly proportional to the ratio of the increase in capacity on one side of the seismometer to the decrease in capacity on the opposite side, the polarity of the voltage being controlled by the sense of armature deviation. Where current source 73 supplies direct current, the voltage applied to the control grid of tube 69 is proportional to the velocity of movement of the armature relative to the casing whereas, when source 73 supplies alternating current, the voltage applied to the control grid is proportional to the displacement of the armature relative to the casing. It will be apparent from this circuit that the use of the double section capacitance doubles the output over the value which would be obtained if only a single section were utilized. With this circuit, the amplifier output voltage faithfully reproduces the seismic waves incident upon the seismometer.

Figure 4:
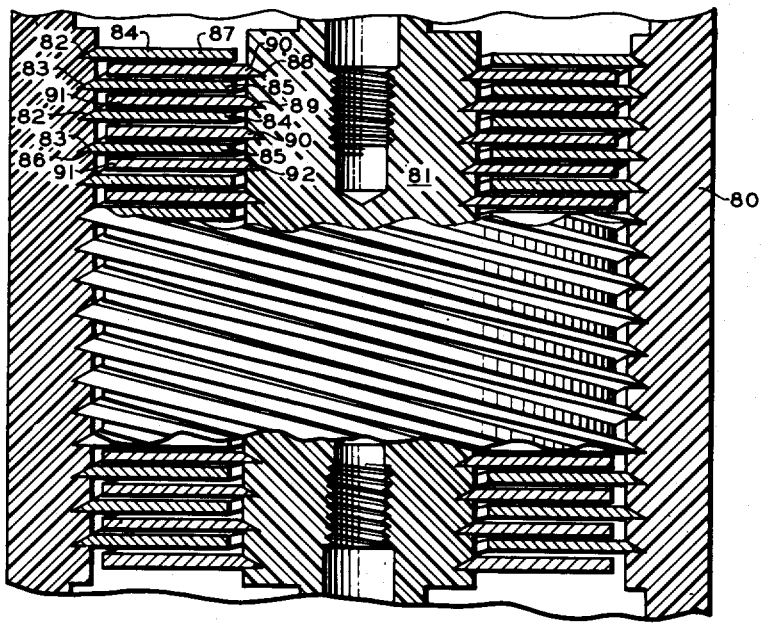
Figure 4 is a vertical sectional view, partially in elevation, of a modified form of seismometer.

Referring now to Figure 4, I have shown a still further modification of the seismometer of Figures 1 and 2. This unit includes a cylindrical casing 80 within which a suspended element 81 is movable in a longitudinal direction. The element 81 is supported by suitable spring suspensions, not shown, which bias it to a predetermined position relative to casing 80 but permit shifting of the suspended element responsive to seismic waves incident upon the seismometer. Two sets 82 and 83 of helical or spiral grooves are cut in the interior wall of casing 80 and these grooves receive respectively, a pair of helical metal condenser elements 84 and 85, each element having a tapered outer edge 86 which fits into the corresponding grooves 82 or 83 together with a thin flat inner portion 87 which protrudes radially inward from the corresponding groove 82 or 83. The elements 84 and 85 may be conveniently formed upon a lathe and they are fitted into their respective grooves in much the same manner as the nut is screwed onto a bolt. In similar fashion, the suspended element 81 is provided with two sets 88 and 89 of helical or spiral grooves into which are fitted a pair of helical metal condenser elements 90 and 91. These elements are similar to the elements 84 and 85 except that the tapered portion 92 of each of the elements 90 and 91 is formed along the inner edge of the element rather than along the outer edge, the flat plate portions protruding outwardly from the suspended element 81.

It will be noted, therefore, that the elements 90, 91 alternate with the elements 84, 85 when the complete seismometer unit is assembled and that relative movement between casing 80 and suspended element 81 causes the capacitance between the sets of condenser elements to vary in accordance with the magnitude of the disturbance incident upon the seismometer. An important advantage of this construction is that the space in which the condenser elements are mounted is very efficiently utilized, and, of course, the condenser elements may be individually removed for adjustment or replacement merely by unscrewing them from the casing or suspended element.

In Figure 5, I have shown a circuit for transforming the capacitance variations produced by the seismometer into electrical voltages representative thereof. It will be noted that the condenser elements 84, 85, 90 and 91 are represented symbolically upon this diagram, the plates 84 and 85 being connected to the respective terminals of an inductance 94 which is shunted by an alternating current generator 95 and a pair of series connected condensers 96, 97 the junction between which is grounded. The elements 90 and 91, separated by insulating support 81, are connected to the respective control grids of amplifier tubes 98 and 99, the cathodes of which are grounded, and the anodes of which are connected in push-pull circuit arrangement with subsequent amplifier stages. The operation of the circuit is similar to that of Figure 3 but the arrangement of the condenser elements electrically is such that they are adapted for connection to a push-pull amplifier, rather than to a single ended amplifier as in Figure 3. The described seismometer together with the circuit of Figure 5 responds, in a very sensitive manner, to movement of the ground upon which the seismometer is positioned resulting from seismic waves.

While the invention has been described in connection with a present, preferred embodiment thereof, it is to be understood that this description is illustrative only and is not intended to limit the invention, the scope of which is defined by the appended claims.

Having described my invention, I claim:

1. A capacitive seismometer comprising, in combination, a casing having an interior passage, a helical threaded portion formed within said passage, said threaded portion having a continuous helical surface of conductive metal, an armature having an exterior helical threaded portion including a continuous surface of conductive metal, said threaded portion of said armature being interleaved with the threaded portion in said passage, one of said threaded portions being of smaller width than the other threaded portion, and means for freely suspending said armature within said passage whereby relative longitudinal axial movement between said armature and said casing produces a change in capacitance between said metal surfaces.

2. A capacitive seismometer, in combination, a casing having an interior passage, a helical threaded portion formed within said passage, said threaded portion having two continuous helical surfaces of conductive metal, an armature having an exterior helical threaded portion including a conductive surface contiguous to said first metal surface and a second conductive surface contiguous to said second metal surface, the threaded portions of said armature and said passage being interleaved, and means for freely suspending said armature within said passage whereby relative movement between said armature and said casing moves one set of conductive surfaces toward each other and the other set of conductive surfaces away from each other.

3. A capacitive seismometer comprising, in combination, a casing having an interior passage, a helical threaded portion formed within said passage, said threaded portion having two continuous helical surfaces of conductive metal, an armature having an exterior helical threaded portion including a conductive surface contiguous to said first metal surface and a second conductive surface contiguous to said second metal surface, the threaded portions of said armature and said passage being interleaved, a pair of flat spiral springs mounted, respectively, at opposite ends of said passage, said armature being freely suspended by said springs whereby relative movement between said armature and said casing moves one set of conductive surfaces toward each other and the other set of conductive surfaces away from each other.

4. A capacitive seismometer comprising, in combination, a casing having an interior passage, a helical threaded portion formed within said passage, said threaded portion having two continuous helical surfaces of conductive metal, an armature having an exterior helical threaded portion including a conductive surface contiguous to said first metal surface and a second conductive surface contiguous to said second metal surface, the threaded portions of said armature and said passage being interleaved, a pair of flat spiral springs mounted, respectively, at opposite ends of said passage, said armature being freely suspended by said springs whereby relative movement between said armature and said casing moves one set of conductive surfaces toward each other and the other set of conductive surfaces away from each other, and a spring biasing said armature to a position where said conductive surfaces are equally spaced from said metal surfaces.

5. A capacitive seismometer comprising, in combination, a casing having an interior passage, two helical threaded portions of opposite pitch formed within said passage, each threaded portion having a continuous helical surface of conductive metal, an armature having two exterior helical threaded portions of opposite pitch which are interleaved with the threaded portions in said passage, each threaded portion on the armature including a continuous surface of conductive metal closely spaced to one of the metal surfaces formed in said casing, and means for freely suspending said armature within said passage whereby relative movement between said armature and said casing produces a change in capacitance between said metal surfaces.

6. A capacitive seismometer comprising, in combination, a casing having an interior passage, two helical threaded portions of opposite pitch disposed in adjoining relation within said passage, the adjacent ends of said threaded portions being cut away to form a cylindrical bore, a sleeve of insulating material disposed within said bore and having a flanged portion dividing said casing into two sections which are electrically insulated from each other, said threaded portions each having a continuous helical surface of conductive metal, an armature having two exterior helical threaded portions in said passage, the threaded portions of said armature and said passage being interleaved, said armature including a cut away cylindrical portion between said threaded portions which fits within said insulating sleeve, each threaded portion of the armature having a continuous helical surface of conductive metal which is closely spaced to a corresponding metal surface in said casing, and means for freely suspending said armature within said passage whereby relative movement between said armature and said casing produces an increase in capacitance between one set of metal surfaces and a decrease in capacitance of similar magnitude between the other set of metal surfaces.

7. A capacitive seismometer comprising, in combination, a casing having an interior passage, two helical threaded portions of opposite pitch disposed in adjoining relation within said passage, the adjacent ends of said threaded portions being cut away to form a cylindrical bore, a sleeve of insulating material disposed within said bore and having a flanged portion dividing said casing into two sections which are electrically insulated from each other, said threaded portions each having a continuous helical surface of conductive metal, an armature having two exterior helical threaded portions in said passage, the threaded portions of said armature and said passage being interleaved, said armature including a cut away cylindrical portion between said threaded portions which fits within said insulating sleeve, each threaded portion of the armature having a continuous helical surface of conductive metal which is closely spaced to a corresponding metal surface in said casing, an insulating support secured to each end of said armature, a flat coil spring mounted within said passage at each end of said casing, each spring being secured to one of said insulating supports to freely suspend the armature within the casing, and means for biasing said armature to a position at which both sets of metal surfaces are equally spaced from each other.

8. A capacitive seismometer comprising, in combination, a casing having an interior passage, two helical threaded portions of opposite pitch disposed in adjoining relation within said passage, the adjacent ends of said threaded portions being cut away to form a cylindrical bore, a sleeve of insulating material disposed within said bore and having a flanged portion dividing said casing into two sections which are electrically insulated from each other, said threaded portions each having a continuous helical surface of conductive metal, an armature having two exterior helical threaded portions in said passage, the threaded portions of said armature and said passage being interleaved, said armature including a cut away cylindrical portion between said threaded portions which fits within said insulating sleeve, each threaded portion of the armature having a continuous helical surface of conductive metal which is closely spaced to a corresponding metal surface in said casing, an insulating support secured to each end of said armature, a flat coil spring mounted within said passage at each end of said casing, each spring being secured to one of said insulating supports to freely suspend the armature within the casing, a piston mounted for rectilinear movement at one end of said passage, a stop, means urging said piston into engagement with said stop, a spring interconnecting said piston and one of said insulating supports to maintain said armature in a position wherein both sets of contact surfaces are equally spaced from each other, and means for effecting longitudinal movement of said stop to vary the position of said armature relative to said casing.

9. A capacitive seismometer comprising, in combination, a casing of electrically insulating material having an interior passage, a helical threaded portion of rectangular cross section formed within said passage, said threaded portion having two continuous helical surfaces of conductive metal formed, respectively, on opposite sides of said threaded portion, an armature having an exterior threaded portion which is interleaved with the threaded portion of said casing, one of said threaded portions being of smaller width than the other threaded portion, said armature being formed from conductive metal, and means for freely suspending said armature within said casing whereby relative movement between said armature and said casing produces a change in capacitance between said armature and said metal surfaces.

10. A capacitive seismometer comprising, in combination, a casing of electrically insulating material having an interior passage, a helical threaded portion of rectangular cross section formed within said passage, said threaded portion having two continuous helical surfaces of conductive metal formed on opposite sides of said thread, an armature having an exterior helical threaded portion which is interleaved with and of smaller width than the threaded portion in said passage, said armature forming a variable capacitance unit with each of said plated surfaces, and means for freely suspending said armature within said passage whereby relative movement between said armature and said casing increases the capacitance between said armature and one plated metal surface and decreases the capacitance between said armature and the other plated metal surface.

11. A capacitive seismometer comprising, in combination, a casing having an inner passage, a second element positioned for longitudinal movement in said passage, spring suspension mounting means for freely suspending said second element within said passage, a set of helical grooves in said casing, a set of helical grooves formed in said suspended element, and a thin spiral metal condenser element disposed in each of said grooves so that each turn of one condenser element is positioned between two turns of the other condenser element.

12. A capacitive seismometer comprising, in combination, a casing having an inner passage, a second element positioned for longitudinal movement in said passage, means for freely suspending said second element within said passage, two sets of interlaced spiral grooves formed in said casing, two sets of spiral grooves formed in said suspended element, all of said grooves having the same pitch, and a thin spiral metal condenser element carried by each of said grooves whereby the turns of the four condenser elements are mounted in alternating relation proceeding from one end to the other end of said casing.

RAYMOND G. PIETY.

References Cited in the file of this patent

UNITED STATES PATENTS

| Number | Name | Date |
| --- | --- | --- |
| 1,610,122 | Edenburg | Dec. 7, 1926 |
| 1,737,074 | Brand | Nov. 26, 1929 |
| 1,767,715 | Stoekle | June 24, 1930 |
| 1,820,240 | Michell | Aug. 25, 1931 |
| 2,063,137 | Whitenack | Dec. 8, 1936 |
| 2,225,855 | Brown | Dec. 24, 1940 |
| 2,297,488 | Luderitz | Sept. 29, 1942 |
| 2,309,560 | Welty | Jan. 26, 1943 |
| 2,331,624 | Parr | Oct. 12, 1943 |
| 2,365,218 | Rogers | Dec. 19, 1944 |
| 2,377,869 | Elliott | June 12, 1945 |
| 2,438,550 | Ertzmann | Mar. 30, 1948 |
| 2,442,491 | Gieskieng | June 1, 1948 |
| 2,503,248 | Deeter | Apr. 11, 1950 |